(12) United States Patent
Lange et al.

(10) Patent No.: US 7,560,840 B2
(45) Date of Patent: Jul. 14, 2009

(54) ROTOR ARRANGEMENT FOR A UNILATERAL TRANSVERSE FLUX MACHINE WITH FLUX CONCENTRATION

(75) Inventors: Andreas Lange, Zang (DE); Uwe Mühlberger, Heidenheim (DE); Rolf Hoffmann, Heidenheim (DE); Joana Verde, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 12/033,289

(22) Filed: Feb. 19, 2008

(65) Prior Publication Data
US 2008/0218021 A1    Sep. 11, 2008

(30) Foreign Application Priority Data
Mar. 7, 2007    (DE) ............. 10 2007 011 369

(51) Int. Cl.
    *H02K 21/02*    (2006.01)
(52) U.S. Cl. .................................. 310/156.02
(58) Field of Classification Search ............. 310/156.02
    See application file for complete search history.

(56) References Cited
U.S. PATENT DOCUMENTS
3,737,693 A * 6/1973 Mishima .................... 310/67 R
5,051,641 A   9/1991 Weh
5,973,436 A * 10/1999 Mitcham .................... 310/266
6,384,504 B1 * 5/2002 Ehrhart et al. .......... 310/156.55
6,700,267 B2 * 3/2004 Weiss ........................ 310/112
6,949,855 B2 * 9/2005 Dubois et al. .............. 310/152

FOREIGN PATENT DOCUMENTS

| DE | 35 36 538 | 4/1987 |
| DE | 37 05 089 | 2/1989 |
| DE | 39 04 516 | 6/1990 |
| DE | 10 2004 057 101 | 6/2006 |
| EP | 1 005 136 | 1/2003 |

* cited by examiner

*Primary Examiner*—Burton Mullins
(74) *Attorney, Agent, or Firm*—Baker & Daniels LLP

(57) ABSTRACT

A rotor arrangement for a unilateral transverse flux machine with flux concentration which is in interaction via an air gap with a coaxially arranged stator arrangement with stator poles and interposed annular winding. The rotor includes rotor pole shoes in the circumferential direction with interposed permanent magnets with changing poling. A rotor pole unit with rotor pole shoes is provided for each stator pole unit of the stator pole arrangement, with adjacent rotor pole shoes of one phase being connected with one keeper each.

17 Claims, 2 Drawing Sheets

ROTOR ARRANGEMENT FOR A UNILATERAL TRANSVERSE FLUX MACHINE WITH FLUX CONCENTRATION

The invention relates to a rotor arrangement for a unilateral transverse flux machine with flux concentration according to DE 10 2004 057 101 A1.

Synchronous machines with transverse flux guidance have a magnetic flux which is not directed in a longitudinal direction as is usually the case, but is directed in a transverse direction. The term of a transverse flux machine shall be used below for such an electric machine.

In the case of a rotatably arranged transverse flux machine, permanent magnets according to the number of poles of the machine are arranged in the circumferential direction on the rotor. The magnetic flux of the permanent magnets can be guided to the air gap by means of flux conductor elements. A stator of the electric machine is arranged coaxially to the rotor by forming an air gap, in which an electric armature winding is enclosed substantially on three sides by means of a U-shaped yoke from a magnetically well conducting material. The end surfaces of the U-shaped yoke which act as poles of the stator are each associated with permanent magnets of the rotor on the opposite side of the air gap. In one possible embodiment, the U-shaped yokes of the stator are oriented to be interlaced relative to a direction parallel to the rotational axis of the machine, so that in the case of an arrangement of the permanent magnets of the rotor in the parallel direction to the rotational axis a magnetic flux is generated which forms a torque as a result of the magnetic difference in potential. An offset by one pole pitch is preferred for the interlaced arrangement of the stator poles. An interlaced rotor module is provided as an alternative instead of an interlaced arrangement of the magnetic pole structure of the stator.

Reference is hereby made for example to specifications DE 37 05 089 C2, DE 35 36 538 A1 and DE 39 04 516 C1 for generic arrangements of transverse flux machines.

As compared with conventional machines, transverse flux machines come with the advantage that an increase of the torque can be achieved by increasing the number of poles. This advantage is offset however by the complexity of the structure of a transverse flux machine which consists of a large number of individual parts, so that solutions for simplifying the mechanical construction of transverse flux machines are sought.

The present application deals with unilateral transverse flux machines. In such a unilateral transverse flux machine, U-shaped yokes which enclose the winding and are provided for guiding the magnetic flux in the stator are arranged merely on one side of the permanent magnets of the rotor. The configuration of a unilateral transverse flux machine is shown for example in the specification EP 1 005 136 A1. Especially in the case of applications with a space which is limited in the radial direction such as drives for vehicles or ships, an especially slender arrangement of transverse flux machines is preferable, so that especially unilateral transverse flux machines are considered for this purpose.

The disadvantage of EP 1 005 136 A1 must be seen by the fact that the arrangement and fastening of the U-yokes in the stator and especially in the rotor is very complex. Moreover, highest demands are placed on the material of the flux conducting elements concerning magnetic flux conduction.

DE 10 2004 057 101 A1 further describes an arrangement of a unilateral transverse flux machine in which laminated stator pole units and keepers are used in the stator. The armature winding is arranged between two each of said stator pole units which are offset in the circumferential direction by one pole pitch. The corresponding rotor unit consists of U-shaped flux conducting elements which are arranged in an alternating manner with the permanent magnets. In the case of the high magnetic reversal frequencies and the magnetic flux guidance necessary in all three directions of space, especially high demands are placed on the material of the flux conducting elements.

In the preferred embodiment of the rotor, cut strip-wound cores or pressed soft magnetic powder composites are provided as materials.

The pressed soft magnetic powder composites come with the disadvantage however that they lead to high magnetic reversal and conduction losses and to a respective disadvantageous heating. The cut strip-wound cores come with the disadvantage that they have rather large production tolerances and that only certain directions of the lamination are possible as a result of production. This leads at least to serious limitations in the flexibility in the constructed space.

The invention is based on the object of providing a rotor arrangement for a unilateral transverse flux machine which offers high spatial flexibility and ensures ideal utilization of space in combination with magnetic and production-related preconditions.

In order to achieve this object it is proposed that for a unilateral transverse flux machine of slender configuration the rotor arrangement must comprise elements for flux concentration which are shaped in such a way that an effective concentration of the magnetic fluxes is caused in combination with low leakage losses at the same time.

In the arrangement as proposed in accordance with the invention, a rotor pole unit is associated with each stator pole unit in a corresponding manner via an air gap. The permanent magnets are arranged in the circumferential direction between the soft magnetic rotor pole shoes of each rotor pole unit. Moreover, the respectively adjacent rotor pole shoes of the individual rotor pole unit of one phase is each connected with a keeper. In a constructional respect, the rotor pole shoes and keepers can be placed on a radially external support structure.

In the rotor arrangement in accordance with the invention, the required magnetic flux guidance is ensured in all three directions of space. The used materials principally do not play any role. Pressed soft magnetic materials can be used for example, as are also described in the aforementioned state of the art. However, these materials have the known disadvantage of a relatively strong heating at a high remagnetizing frequency.

Further advantageous embodiments arise from the remaining dependent claims and from the embodiments which will be explained below by reference to the drawings, wherein:

Figure 1:
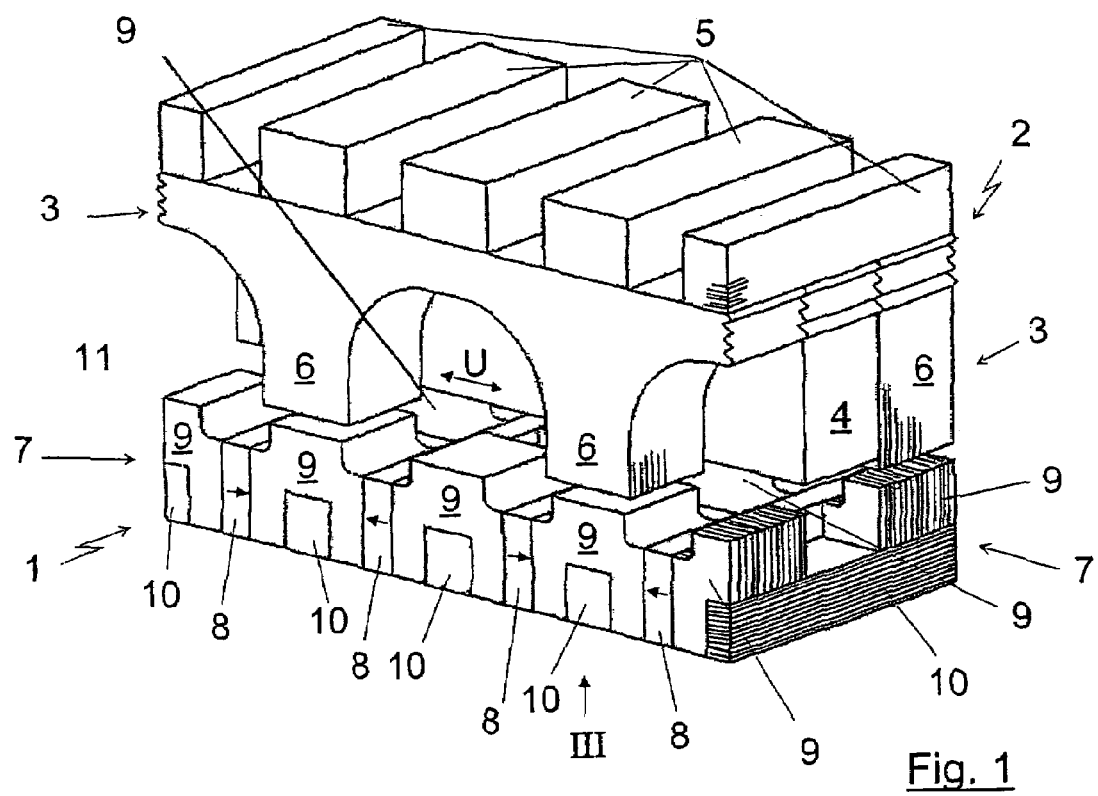
FIG. 1 shows a section of the rotor arrangement in accordance with the invention with corresponding stator arrangement.

FIG. 1 shows a section of a rotor arrangement 1 with a corresponding stator arrangement 2 of a transverse flux machine. In order to simplify the illustration, the section is shown in a plane manner by omitting the curvature of the elements about the rotational axis. The configuration of the stator arrangement 2 consists of two stator pole units 3, an armature winding 4 extending in the circumferential direction U of the transverse flux machine and the stator keepers 5. The individual stator poles 6 of the respective stator pole unit 3 are arranged offset with respect to each other in the circumferential direction. The stator pole units 3 and the stator keepers 5 can be provided with a laminated configuration, as shown in the example. Preferably, the directions of the laminations are twisted about 90° with respect to each other. The arrangement can be understood as being in analogy to the initially cited state of the art.

The rotor arrangement 1 consists of the rotor pole units 7 associated with the respective stator pole units 3, which rotor pole units are present in multiple numbers according to the number of phases. The ideal arrangement of the rotor arrangement 1 as shown in FIG. 1 shows permanent magnets 8 and rotor pole shoes 9 arranged in an alternating manner in the circumferential direction U. Adjacent rotor pole shoes 9 of the individual rotor pole unit 7 of a phase are each connected with a keeper 10.

Figure 2:
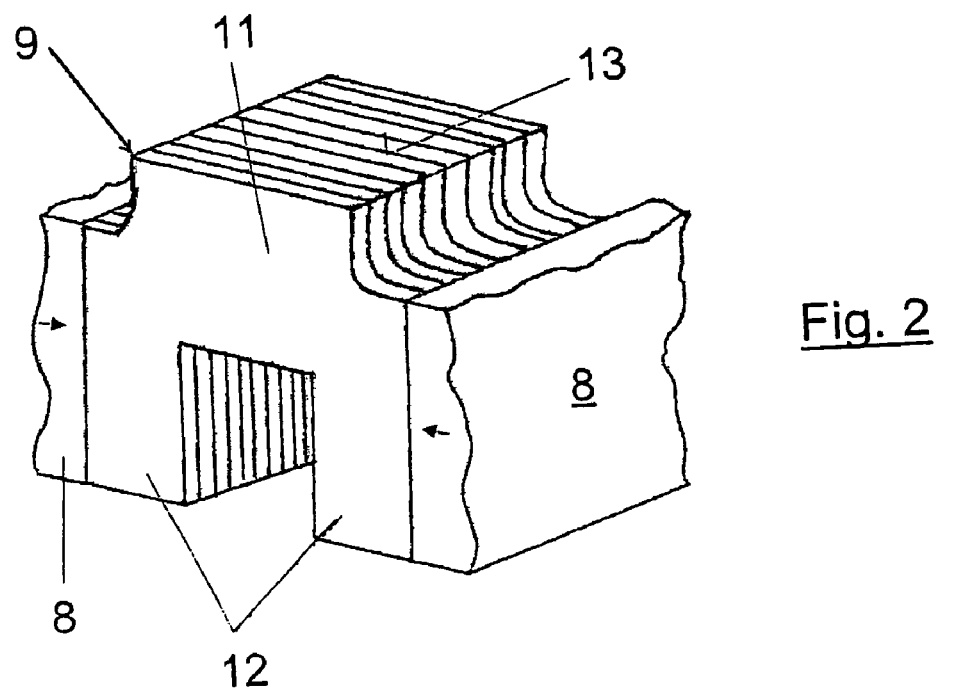
FIG. 2 shows a detailed view of an individual rotor pole shoe.

The rotor pole shoes 9 are arranged in a substantially U-shaped manner in a plane situated perpendicular to the rotor or rotor axis. As can be seen from the detailed illustration of a rotor pole shoe 9 in FIG. 2, the U-shaped configuration comprises a base 11 and two legs 12, with the base 11 being oriented in the direction of the stator arrangement 2. Permanent magnets 8 each rest on the legs 12 of the rotor pole shoes 9 on their sides situated on the outside in the circumferential direction U. They are aligned in their magnetic orientation in an alternating manner in the circumferential direction U.

As a result of the U-shaped arrangement of each rotor pole shoe 9 it is possible to arrange the permanent magnets 8 on the legs 12, with their direction of magnetization (as indicated by the arrows in FIG. 2) each extending parallel to the circumferential direction U, but opposite to each other, which means a first permanent magnet 8 on one side of a leg 12 is magnetized in the rotational direction and a second permanent magnet on the other side of the respective other leg 12 is magnetized against the direction of rotation. The flux distribution characteristic will then be provided with a radial directional component in the rotor pole shoe 9, so that the magnetic flux exits in a substantially radial manner on the face surfaces 13 of base 11 which face in the direction of the poles of the stator pole unit 3. Moreover, the side of the base 11 facing the stator arrangement is arranged in such a way that the air gap to the stator poles 6 is smaller in the area of a central circumferential surface of base 11 than in the area of the legs of the pole shoe with the adjacent permanent magnets.

As a result of this solution it is possible to adjust the shape of the permanent magnets 8 in such a way that the ratio of built-in and effectively arranged magnetic mass is improved. This is due to the fact that the magnetic field of the permanent magnets can be injected along relevant parts of the contact surface between the permanent magnets 8 and the legs 12 of the U-shaped rotor pole shoes 9. A higher magnetic flux density can be injected into the U-shaped rotor pole shoes 9 for a permanent magnet 8 which has a larger axial extension in comparison with the extension in the circumferential direction and thus an enlarged cross-sectional surface area, with said rotor pole shoes in combination with the keepers 10 causing the function of a flux conduction and concentration and a deflection of the magnetic flux in the direction towards the air gap between the rotor arrangement 1 and the stator arrangement 2 and thus in the direction towards the poles of the stator pole units 3.

Figure 3:
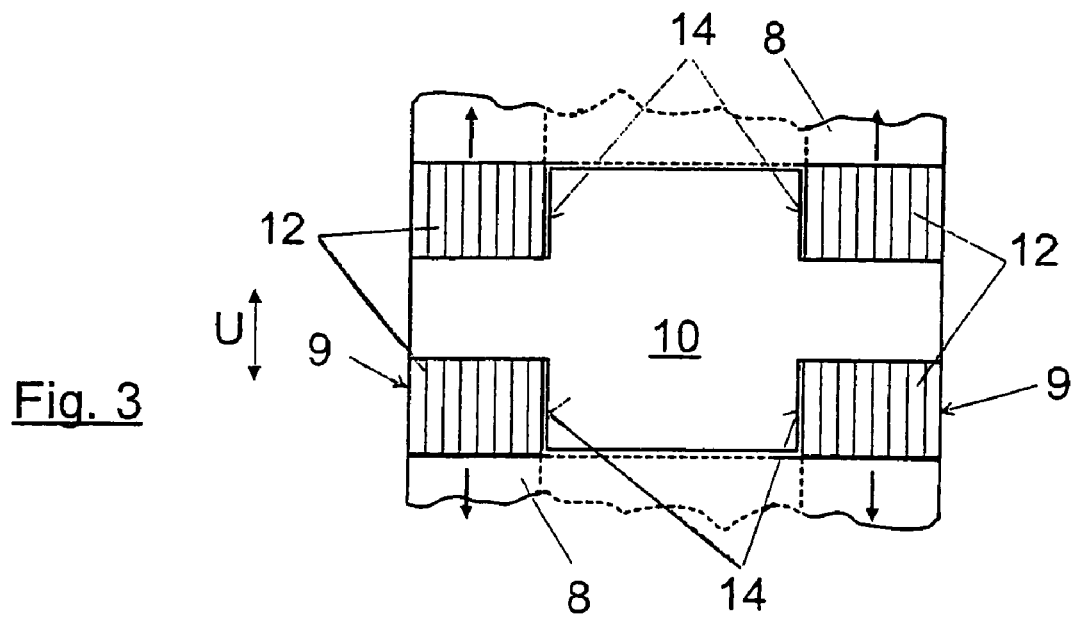
FIG. 3 shows a view according to III in FIG. 1 with rotor pole shoes, keepers and permanent magnets.

When the stator arrangement 2 is arranged in such a way that its poles have the offset in the circumferential direction which is necessary for generating a torque, then it is possible to arrange the U-shaped rotor pole shoes 9 over straight keepers 10 without offset in the circumferential direction, so that the rotor pole shoes 9 connected via the keepers 10 are not interlaced relative to the plane containing the rotational axis of the transverse flux machine. Accordingly, the rotor pole shoes 9 of each rotor pole unit 7 or their legs facing in the same direction are not offset with respect to each other in the circumferential direction. As a result, a single permanent magnet 8 or permanent magnets 8 each associated with the legs 12 of each rotor pole shoe 9 in each of the rotor pole units 7 can be used with the same direction of magnetization in the alternating arrangement of permanent magnets 8 and rotor pole shoes 9 between two rotor pole shoes 9 which are arranged adjacent to each other in the respective rotor pole unit 7 and follow each other successively in each rotor pole unit 7. This is shown in FIG. 3 by way of example by the illustration with the partly broken line of the permanent magnets 8.

The keepers 10 rest on the sides of the legs 12 of the rotor pole shoes 9 which are situated on the inside in the circumferential direction U. Each rotor pole shoe 9 therefore comprises with its legs 12 one end of the keeper 10, so that each keeper 10 connects two of the rotor pole shoes 9. FIG. 3 shows such a combination of rotor pole shoes 9 and keeper 10 from the direction of view of the rotational axis. The keeper 10 which in this case approximately has the shape of a flat cross is provided with a straight arrangement in the axial direction, so that the rotor pole shoes 9 are not interlaced towards each other. The permanent magnets 8 can be recognized here too. They are arranged in a continuous way between the rotor pole units or they can also consist of two discrete permanent magnets 8 which are interrupted in the area between the rotor pole units 7.

The magnetic flux guidance occurs by the permanent magnets 8 in the tangential and radial direction by the rotor pole shoes 9 and in the tangential and axial direction by the keeper 10. As a result of the respective lamination, flux guidance occurring in other directions is substantially prevented. In order to further optimize flux guidance and to prevent the exiting of magnetic flux from the axial face sides 14 of the legs 12 of the rotor pole shoes 9, air gaps are preferably provided there. The rotor pole shoes 9 and the keepers 10 therefore contact each other directly only on their surfaces oriented perpendicular to the circumferential direction, whereas the axial face sides 14 are arranged separate from one another by an air gap. The same applies to the permanent magnets 8 which directly contact the rotor pole shoes 9 on their surfaces of legs 12 which are oriented perpendicular to the circumferential direction. There is no contact between the keeper 10 and the continuously arranged permanent magnets 8. In the area of the air gap to be provided, the sides of the laminations can be arranged in an especially advantageous manner which as a result of production by punching have a lower dimensional accuracy, whereas the contact surfaces are arranged as the surfaces with the highest dimensional accuracy.

As a result of the combination of rotor pole shoes 9 and the keepers 10 of rotor arrangement 1, an optimal arrangement is obtained with respect to the magnetic flux guidance, in which the magnetic circuit can be closed with low leakage losses in conjunction with the stator arrangement 2. This is especially the case when the combination of rotor pole shoes 9 and keepers 10 rests with its side facing the rotational axis on an adversely magnetizable material with $\mu r \approx 1$, e.g. aluminum or a suitable steel. When an outside rotor is chosen for arranging the rotor arrangement 1, the combination of rotor pole shoes 9 and the keepers 10 can rest on a rotor cylinder which can also form the outside jacket of the unilateral transverse flux machine.

Since machines with small external dimensions and a high torque are possible by means of a transverse flux machine with the rotor arrangement 1 in accordance with the invention, the preferred possibilities for applications rest with unilateral transverse flux machines.

This applies especially to such in electric drive units of vehicles such as hybrid vehicles or buses with wheel hub motors or ships.

The invention claimed is:

1. A rotor arrangement in a unilateral transverse flux machine with flux concentration which is in interaction via an air gap with a coaxially arranged stator arrangement with stator poles and an interposed annular winding, comprising rotor pole shoes in the circumferential direction with interposed permanent magnets having alternating poles, wherein a rotor pole unit including the rotor pole shoes is provided for each stator pole unit of the stator arrangement, with adjacent rotor pole shoes of one phase being connected with one keeper each, each said keeper being separate from its respective rotor pole unit, and wherein each said keeper comprises punched soft-iron sheet elements stacked in a radial direction and each of the rotor pole shoes comprises punched soft-iron sheet elements stacked in the axial direction.

2. A rotor arrangement according to claim 1, wherein the rotor pole shoes and the permanent magnets contact each other directly on their surfaces oriented perpendicularly to the circumferential direction.

3. A rotor arrangement according to claim 1, wherein the rotor pole shoes are substantially U-shaped with a base and two legs in a plane situated perpendicularly to the rotor axis, with the base being oriented with its face surface in the direction of the stator arrangement.

4. A rotor arrangement according to claim 3, wherein the rotor pole shoes and the keepers contact each other directly only on their surfaces oriented perpendicularly to the circumferential direction, whereas the axial face sides are separated only by an air gap from each other.

5. A rotor arrangement according to claim 1, wherein the rotor pole shoes and the keepers contact each other directly only on their surfaces oriented perpendicularly to the circumferential direction, whereas the axial face sides are separated only by an air gap from each other.

6. A rotor arrangement according to claim 5, wherein the rotor pole shoes and the permanent magnets contact each other directly on their surfaces oriented perpendicularly to the circumferential direction.

7. A rotor arrangement in a unilateral transverse flux machine with flux concentration which is in interaction via an air gap with a coaxially arranged stator arrangement with stator poles and an interposed annular winding, comprising rotor pole shoes in the circumferential direction with interposed permanent magnets having alternating poles, wherein a rotor pole unit including the rotor pole shoes is provided for each stator pole unit of the stator arrangement, with adjacent rotor pole shoes of one phase being connected with one keeper each, wherein the rotor pole shoes and the respective keepers contact each other directly only on their surfaces oriented perpendicularly to the circumferential direction, whereas their axial face sides are separated only by an air gap from each other.

8. A rotor arrangement according to claim 7, wherein the rotor pole shoes comprise sheet elements stacked in the axial direction.

9. A rotor arrangement according to claim 8, wherein the rotor pole shoes and the permanent magnets contact each other directly on their surfaces oriented perpendicularly to the circumferential direction.

10. A rotor arrangement according to claim 7, wherein the sheet elements are punched soft-iron sheet.

11. A rotor arrangement according to claim 10, wherein the rotor pole shoes and the permanent magnets contact each other directly on their surfaces oriented perpendicularly to the circumferential direction.

12. A rotor arrangement according to claim 7, wherein the rotor pole shoes and the permanent magnets contact each other directly on their surfaces oriented perpendicularly to the circumferential direction.

13. A rotor arrangement according to claim 7, wherein the rotor pole shoes are arranged substantially U-shaped with a base and two legs in a plane situated perpendicularly to the rotor axis, with the base being oriented with the face surface in the direction of the stator arrangement.

14. A rotor arrangement in a unilateral transverse flux machine with flux concentration which is in interaction via an air gap with a coaxially arranged stator arrangement with stator poles and an interposed annular winding, comprising rotor pole shoes in the circumferential direction with interposed permanent magnets having alternating poles, wherein a rotor pole unit including the rotor pole shoes is provided for each stator pole unit of the stator arrangement, with adjacent rotor pole shoes of one phase being connected with one keeper each, wherein the keepers and the permanent magnets have no common contact surfaces.

15. A rotor arrangement in a unilateral transverse flux machine with flux concentration which is in interaction via an air gap with a coaxially arranged stator arrangement with stator poles and an interposed annular winding, comprising rotor pole shoes in the circumferential direction with interposed permanent magnets having alternating poles, wherein a rotor pole unit including the rotor pole shoes is provided for each stator pole unit of the stator arrangement, with adjacent rotor pole shoes of one phase being connected with one keeper each, wherein the rotor pole shoes are arranged substantially U-shaped with a base and two legs in a plane situated perpendicularly to the rotor axis, with the base being oriented with its face surface in the direction of the stator arrangement, and wherein the legs of the rotor pole shoes each rest on the permanent magnet with their sides situated on the outside in the circumferential direction, and the sides situated on the inside in the circumferential direction rest on the keeper.

16. A rotor arrangement according to claim 15, wherein the rotor pole shoes and the keepers contact each other directly only on their surfaces oriented perpendicularly to the circumferential direction, whereas the axial face sides are separated only by an air gap from each other.

17. A rotor arrangement in a unilateral transverse flux machine with flux concentration which is in interaction via an air gap with a coaxially arranged stator arrangement with stator poles and an interposed annular winding, comprising rotor pole shoes in the circumferential direction with interposed permanent magnets having alternating poles, wherein a rotor pole unit including the rotor pole shoes is provided for each stator pole unit of the stator arrangement, with adjacent rotor pole shoes of one phase being connected with one keeper each, wherein the rotor pole shoes are arranged substantially U-shaped with a base and two legs in a plane situated perpendicularly to the rotor axis, with the base being oriented with its face surface in the direction of the stator arrangement, and wherein the face surface of the base facing the stator arrangement is arranged in such a way that the air gap is smaller in the area of the stator poles than in the area of the legs of the pole shoes with adjacent permanent magnets.

* * * * *